United States Patent

Lehnen

[11] Patent Number: 5,847,289
[45] Date of Patent: Dec. 8, 1998

[54] PROFILE FOR ACCOMMODATING A SENSOR

[75] Inventor: Hans-Günter Lehnen, Wadern-Noswendel, Germany

[73] Assignees: Daimler-Benz AG, Stuttgart, Germany; I.E.E. International Electronics & Engineering S.A.R.L., Luxembourg, Luxembourg

[21] Appl. No.: 624,582
[22] PCT Filed: Jul. 27, 1995
[86] PCT No.: PCT/DE95/00980
 § 371 Date: Apr. 24, 1996
 § 102(e) Date: Apr. 24, 1996
[87] PCT Pub. No.: WO96/04537
 PCT Pub. Date: Feb. 15, 1996

[30] Foreign Application Priority Data

Aug. 4, 1994 [DE] Germany ............ 44 27 537.4

[51] Int. Cl.⁶ ......................................... G01L 1/00
[52] U.S. Cl. ............... 73/862.381; 73/756; 73/862.636; 49/477.1
[58] Field of Search ................... 73/756, 866.5, 73/432.1, 862.381, 862.541, 862.636, 862.637; 49/477.1, 26, 27, 28

[56] References Cited

U.S. PATENT DOCUMENTS

| 2,276,843 | 3/1942 | Hathaway .............. 73/862.636 X |
| 3,410,135 | 11/1968 | Reynaud ............... 73/862.636 |
| 3,431,775 | 3/1969 | Wirth .................. 73/862.636 X |
| 3,875,481 | 4/1975 | Miller et al. ......... 73/862.636 X |
| 4,618,797 | 10/1986 | Cline . | |
| 4,754,653 | 7/1988 | Hafner et al. ......... 73/862.636 X |
| 5,261,266 | 11/1993 | Lorenz et al. ......... 73/1 B |
| 5,318,145 | 6/1994 | Vollmer ............... 49/141 |
| 5,334,876 | 8/1994 | Washeleski et al. ..... 49/26 |

FOREIGN PATENT DOCUMENTS

| 522280A1 | 1/1993 | European Pat. Off. . |
| 371168A | 11/1988 | Germany . |
| 9016410U | 4/1991 | Germany . |
| 4241382A | 6/1993 | Germany . |
| 9407445 | 7/1994 | Germany . |
| A-343685 | 11/1989 | Israel . |
| 60-88334A | 5/1985 | Japan . |
| 87942 | 7/1992 | Luxembourg . |
| A-335838 | 3/1988 | Switzerland . |
| 2158291 | 5/1984 | United Kingdom . |
| 2276355 | 9/1994 | United Kingdom . |
| 2280646 | 2/1995 | United Kingdom . |

*Primary Examiner*—Richard Chilcot
*Assistant Examiner*—Harshad Patel
*Attorney, Agent, or Firm*—James Creighton Wray; Meera P. Narasimhan

[57] ABSTRACT

A rubber-like section with one or several hollow chambers is provided as a sensor receiving section for housing and protecting pressure-actuated sensors, in particular for mounting behind screens and as window guiding sections, in particular for car windows with U-shaped window guiding frames. The design of the mounting space, i.e. the main hollow chamber, allows the sensor to be threaded into the section even over a longer axial distance, to be clamped therein without play and to be firmly held in its mounting position. The inner contour of the main hollow chamber, which is adapted to the sensor use, has a central or eccentric bead-like, heel-shaped projection that extends in the axial direction and projects into the hollow chamber. This geometry allows the sensor housed in the hollow chamber to provide its sensor functions. Other inventions related to the outer geometry of the section result therefrom.

22 Claims, 2 Drawing Sheets

PROFILE FOR ACCOMMODATING A SENSOR

BACKGROUND OF THE INVENTION

The invention relates to a flexible rubberlike extruded single or multiple cavity profile serving as a sensor receptacle profile made of EPDM, TPE, PVC or similar materials which in different regions thereof may also be co-extruded of different materials and may also possess different degrees of Shore hardness and bulk densities, serving for the accommodation and the protection of pressure activatable sensors, in particular for being installed behind cover panels in automobiles and as a window guidance profile, in particular for automobile windows with U-shaped window guide frames.

This state of the art comprises a wellnigh endless repertoire of profiles having a variety of functions, such as e.g. for sealing, for decoration, for spacing, as well as for pressure activation by hydraulic or pneumatic force applications according to EP 0 421 287 or as safety switches according to DE 4300 434. It is a common feature of all profiles that they have each been conceived for specific application situations and their geometries are designed accordingly. A particular type of profiles includes those which serve for the accommodation and protection of specific function means such as e.g. pressure activatable sensors. Such profiles are of interest in the automobile industry because for product liability reasons considerations are necessary as to how being squashed by electrically operated installations such as window winders, sliding roofs, pulling closed installations e.g. for also doors—e.g. in public conveyance means—can be prevented reliably.

The effectiveness, the operative reliability and thus the usefulness of such squashing protective systems is substantially co-decided by the sensor systems employed, their response, threshold, their local fitting and accommodation, as well as the degree of overlap of the hazardous linear movement paths.

In this context a variety of different systems are already known, such as e.g. profiles made of conductive elastomers, profiles inside which wires have been included by extrusion and infra-red barriers. All systems are, however, to a greater or lesser degree exposed to damage during handling and installation and are not adjustable in relation to different actions which may arise.

Tactile pressure activatable sensors have now become commercially available which are preferably to be employed as a sensor for electrical window winders, electric sliding roofs and a variety of other electrically operated installations in which a squashing action is to be avoided. This type of sensor takes the form of a pressure sensing element, the resistance of which decreases as the applied pressure increases. The pressure sensitivity of the sensor has been optimised for use in manual touch key controls for electronic apparatus and for use in mechanical devices. Such sensors can be adjusted in relation to actions as occur in practice, since the output signal varies in accordance with the sensitivity as a function of the magnitude of the pressure application for which reason the sensor does not merely act as a pure switch (solely having an on/off function) but, when subjected to loading, delivers as an output signal a greater or lesser resistance drop depending on the pressure applied, which subsequently can be further processed electrically. In order to be able to employ such a tactile pressure activatable sensor in an appropriate manner it is however first necessary to accommodate it in an appropriate installation space, ie. an interior which affords to it protection against continuous environmental effects and which permits the performance of the sensor function.

Accordingly a need exists to develop a profile having a maximum enclosing function or which is permanently closed, which is suitable for the accommodation, e.g. the threading thereinto and the accommodation therein of relatively long linearly extending sensors, in particular of such kind as are employed in the automobile industry in sectors where a hazard of being squashed is to be counter-acted and permitting the employment of electrically operated means such as window winders, sliding roofs, drawing closed insallations on doors, shutters etc. Conventional closure forming profiles, that is to say, cavity profiles do protect against environmental effects such as water splashing, dampness, dust etc., but neither provide for a deformation zone appropriately designed for the purpose nor for an internal profiling which makes due allowance for the sensor function.

SUMMARY OF THE INVENTION

It has now been found that a single or multiple cavity profile is particularly suitable if the main cavity which extends axially through the profile comprises an interior contouring adapted to the respective sensor geometry, designed in accordance with the object of the sensor and further comprises centrally or offset from the centre line on the bottom side or cover side of the main cavity a likewise axially extending bead-like nose-shaped projection directed into the main cavity.

DETAILED DESCRIPTION OF THE PREFERRED EMBODIMENTS

Figure 1:
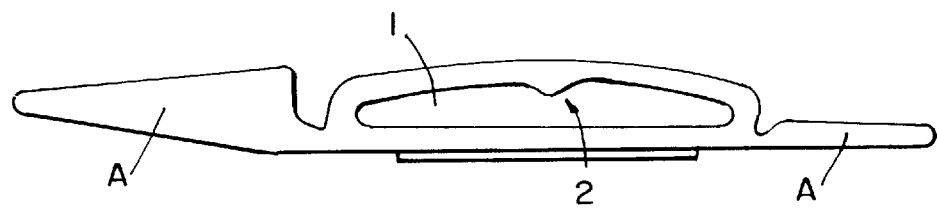
FIG. 1 is a cross-sectional view of a sensor accommodating profile.
Figure 2:
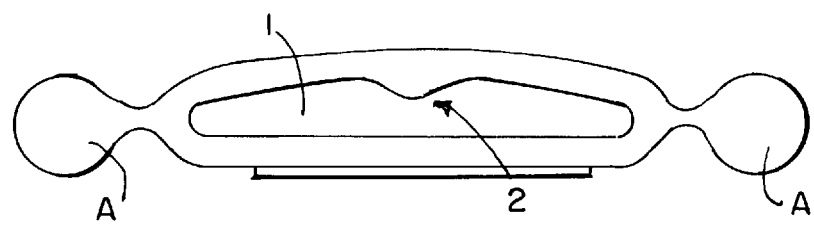
FIG. 2 is a cross-sectional view of an embodiment of the profile similar to FIG. 1.

A thus designed profile ensures the accommodation and protective function and makes it possible by virtue of the nose-shaped bead-like projection directed into the main hollow chamber to also perform the sensor function of the tactile pressure activatable sensor. In this context it does not matter whether the bead-like projection is provided on the bottom or the cover side, but rather, in essence, it matters only that the projection is so directed into the cavity interior that in the event of a pressure application to the profile a pressure transfer takes place by way of the nose onto the activatable region of the sensor. Profiles in accordance with FIGS. 1 and 2 are for example suitable for the installation of such sensor profiles behind cover panels of automobiles. In this context it is important that the base region of the profile, in which is provided the main cavity (1), has a configuration which is as flat as possible and that, parallel to the profile axis on the right hand or left side or both sides of the main cavity (1) there extend axially and continuously wedge-shaped, rhomboidal, circular or ovaloidal external beads (A) which are connected to the lateral zones of the base region by continuous thin webs and in which the configurations of the external bead (A) on the right hand side and the left hand side may be identical or different. Such external beads (A) serve, primarily by virtue of their cross-section, as safety spacer means to prevent the main cavity (1) accommodating the pressure activatable sensor from being squashed. They furthermore perform the function of tear-off edges in the event that the profile need be removed from the cover panel regions.

The use of the profile according to the invention in the case of window guiding profiles is relevant particularly in connection with automobile windows having a U-shaped window guide frame. In this case the state of the art as represented by window guide profiles for U-shaped window guide frames essentially include the following functional features: a base region adjoined both on the left hand and the right hand side by a sealing lip whereof as a rule the geometries differ slightly from one another, which in its particular design are suitable for performing their function and have been successful. However, it is a drawback of these profiles that they cannot be adapted to future innovative safety features. In particular the introduction of systems which are to prevent squashing events require novel profile families which permit the integration of tactile acting sensors which respond to pressure impulses within the sensor active zone in different geometrical configurations and to the greatest possible extent in possible squashing regions.

Accordingly a need exists to develop profile geometries which permit the threading of the sensors with a minimum of problems without the conventional profile functions being disregarded.

Figure 3:
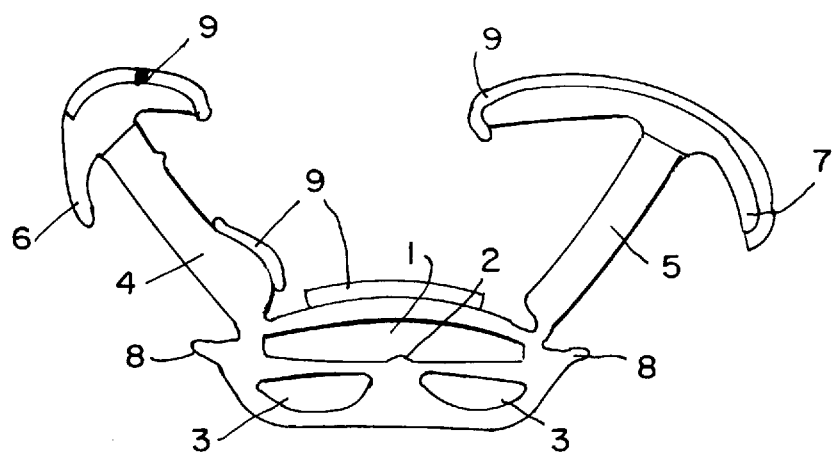
FIG. 3 is a cross-sectional view of another embodiment of the profile of the invention.
Figure 4B:
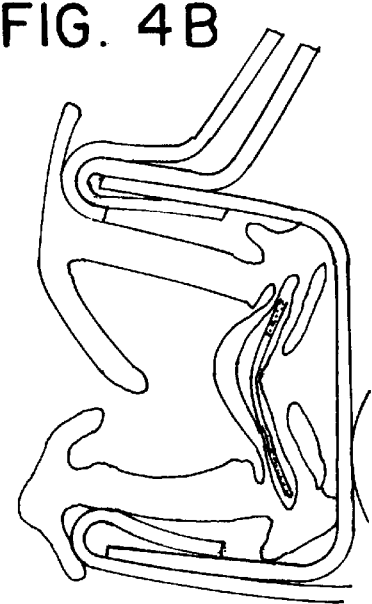
FIGS. 4a, 4b, 4c and 4d illustrate the deformations in the profile under pressure application.
Figure 4C:
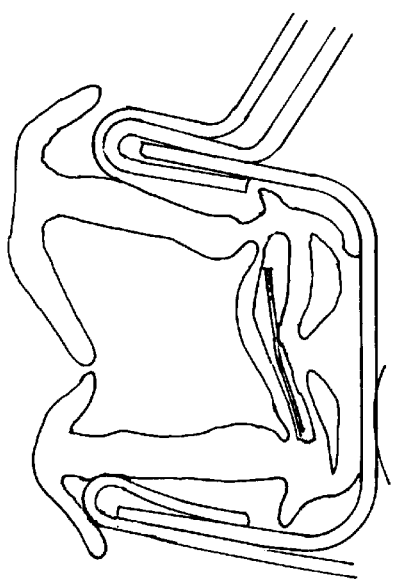
Figure 4A:
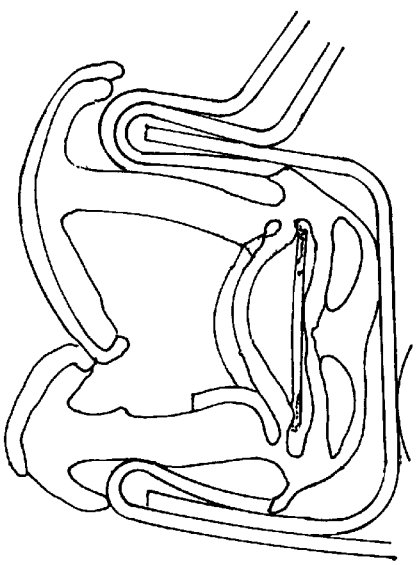
Figure 4D:
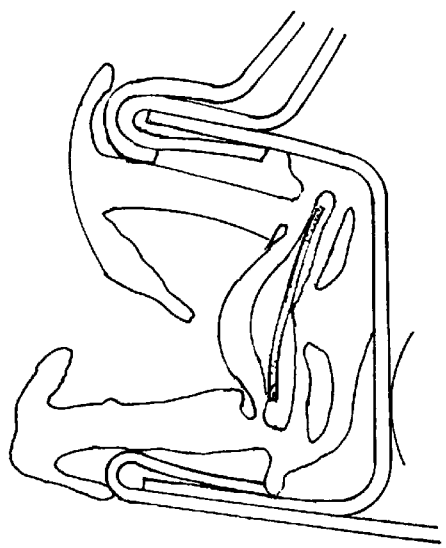

It was also found that for window guide profiles the most favourable solution is one in which the cavity accommodating the sensor is closed allround in the manner of a hollow chamber and is manufactured from the outset in a single extrusion process. By this accommodation in such a cavity which completely encloses the sensor the environmental effects such as dirt, dampness, splashing water etc are substantially excluded. Moreover it was found that the geometry of the cavity (in its cross-section) although corresponding substantially to that of the sensor to be accommodated need nevertheless not be completely identical thereto. Due to the configuration according to the invention of the cavity, that is to say more specifically the main cavity (1) it is possible for the sensor to be threaded into the profile even over major axial distances of e.g. more than 1 m in a proper manner there to be clamped without play and accordingly being stable against slipping, once installed. In FIG. 3 such a window guide profile according to the invention is illustrated to which reference is made in what follows. This illustration shows the region of the main cavity (1) which serves to receive and accommodate the sensor. It is once again emphasised that the internally directed nose, that is to say the bead-like projection (2) extending into the cavity is in accordance with the invention. If due to a tactile impulse along the periphery of the profile a pressure impulse is exercised on the profile, the sensor signal is modulated by the pressure transfer by way of this projection (2) and can then be utilised for electronic processing. The base region of the profile is characterised in that two subsidiary cavities (3) extending parallel to the main cavity (1) are provided parallel to the bead-like projection (2). These subsidiary cavities (3) are specifically so arranged that, in the event of a force application to the limbs (4, 5), they serve as buffer or deformation zones. The manner in which locally differing pressure applications act by their transmission onto the buffer or deformation zone is further illustrated in a special FIG. 4 where this is elucidated. A further characteristic according to the invention of the profile is that it comprises in the base region clamping lips (8) parallel to the profile axis, which project outwardly in a direction normal to the profile axis. Such clamping lips or similar geometrical cross-sectional configurations serve for anchoring or fixation in the corresponding vehicle body configurations. In addition it is a feature of preferred embodiments of the profile according to the invention that the profile comprises U- to V-shaped geometrically identical or geometrically different limbs (4, 5) of mushroom-shaped configuration projecting from the base region, the linear stem region of each of which is of such magnitude that the mushroom-shaped caps (6, 7) of the limbs (4, 5) in the installation position, conforming with the particular use, extend slightly beyond the respective limb upper level of the U-shaped window guide frame. Due to the limbs (4, 5) being longer than the installation space a deformation in the direction of the main cavity (1) becomes possible. In particular the main cavity (1) as well is so deformed by an appropriate pressure application by the webs that the sensor accommodated in the main cavity (1) becomes clamped from both sides and is held in position without play. The geometries and dimensions of the limbs (4, 5) as well as of the subsidiary cavities (3) are so adapted to one another that in the event of deformation sufficient pressure or transverse deformation is applied onto the sensor accommodated inside the main cavity (1), so that its sensor function is assured. It is likewise in accordance with the invention that the mushroom-shaped caps (6, 7) of the limbs (4, 5) have a cap width each adapted to the right hand side or left hand side proudness of the vehicle body. In this manner they can perform the function of cover and retaining lips. According to the invention specific tasks are moreover also given effect to in that the profile in defined surface regions (9) which remain constant in the axial dimension of the profile but which along the profile longitude are continuous or discontinuous, are coated with flock, lubricant varnish or similar lubricating materials, and optionally may also be of different colouration.

FIG. 4 illustrates the invention embodiment in which the stem dimension of the limbs (4, 5) is made too large in a linear sense, wherein certain deformation situations are brought about by pressure application onto both limbs or only one limb at a time. FIG. 4a in this context shows the profile when installed in its non-loaded condition. Neither the subsidiary cavity (3) are deformed nor the stems of the limbs have been depressed. FIG. 4b shows how in the event of a uniform pressure application onto the limbs from both sides a deformation of the base region of the profile results, more particularly by compression of the subsidiary cavity (3) in such a manner that the main cavity (1) bulges upwardly, thereby exercising by way of the bead-shaped and nose-shaped projection (2) in the main cavity (3) a corresponding pressure impulse onto the active zone of the sensor therein accommodated. FIGS. 4c and 4d illustrate the situation equivalent to the aforegoing according to which by the configuration according to the invention of the limbs (4, 5) the objective of the sensor profile and thus of the sensor in the event of pressure application is preserved even if the pressure application is locally restricted to one limb.

The claims which follow are to be considered an integral part of the present disclosure. Reference numbers (directed to the drawings) shown in the claims serve to facilitate the correlation of integers to the claims with illustrated features of the preferred embodiment(s), but are not intended to restrict in any way the language of the claims to what is shown in the drawings, unless the contrary is clearly apparent from the context.

Examples of suitable sensors for use with the present invention are disclosed in the priority document.

I claim:

1. A sensor accommodating profile of flexible, rubber-like extruded material, said profile having different regions with different deformability, and comprising:
   a base portion with a main cavity, said main cavity extending axially through the profile and comprising an axially extending bead-like projection directed into the main cavity,
   at least one deformation zone in a lateral region of said base portion, and
   at least one axially extending, force transducing means, said force transducing means being attached at said lateral region of said base portion for transducing a force to said lateral region of said base portion, said lateral portion being deformed when a force is applied to said force transducing means thereby deforming the main cavity to activate an accommodated sensor.

2. The sensor accommodating profile as claimed in claim 1, wherein the at least one deformation zone comprises two deformation zones, each of the deformation zones being located in a lateral region on either side of said base portion, and
   two axially extending force transducing means, said force transducing means being attached on either side of the profile at said lateral regions of said base portion for transducing a force to said lateral regions of said base portion.

3. The sensor accommodating profile as claimed in claim 2, further comprising two subsidiary cavities located in said lateral region of said base portion on either side of said bead-like projection.

4. The sensor accommodating profile as claimed in claim 2, wherein said force transducing means are configured to allow free ends of said means to extend slightly beyond an upper end of a window guide frame when said profile is installed in said window guide frame.

5. The sensor accommodating profile as claimed in claim 4, wherein the profile generally has a U-shaped cross-section, said U-shape defining an axially extending opening.

6. The sensor accommodating profile as claimed in claim 5, wherein the free ends of said force transducing means comprise cover means for covering the axially extending opening in said U-shaped profile, said cover means extending normally to said force transducing means.

7. The sensor accommodating profile as claimed in claim 6, wherein the caps of said mushroom-shaped limbs form said cover means for covering the axially extending opening in said U-shaped profile.

8. The sensor accommodating profile as claimed in claim 7, wherein the caps of the mushroom-shaped limbs each have a cap width adapted to a right hand side or a left hand side proudness of a vehicle body.

9. The sensor accommodating profile as claimed in claim 2, wherein said force transducer means comprises mushroom-shaped limbs projecting from said base portion of said profile.

10. The sensor accommodating profile as claimed in claim 1, further comprising at least one subsidiary cavity located in said lateral region of said base portion of said profile and extending parallel to the main cavity, said subsidiary cavity forming said deformation zone.

11. The sensor accommodating profile as claimed in claim 1, wherein said profile is adapted for installation in a U-shaped window guide frame of a motor vehicle.

12. The sensor accommodating profile as claimed in claim 11, further comprising securing means for securing said profile inside said window guide frame.

13. The sensor accommodating profile as claimed in claim 12, wherein said securing means comprises clamping lips fixed on said base portion of said profile, said clamping lips projecting outwardly in a direction normal to the profile axis.

14. The sensor accommodating profile as claimed in claim 1, the profile further comprising defined surface regions, said surface regions being constant along an axial dimension of the profile and being continuous or discontinuous along a longitude of the profile, said surface regions having a coating of lubricating material.

15. The sensor accommodating profile as claimed in claim 14, wherein the lubricating material is selected from a group consisting of flock, lubricant, varnish, and similar lubricating materials.

16. The sensor accommodating profile as claimed in claim 14, wherein the defined surface regions are provided at intervals.

17. The sensor accommodating profile as claimed in claim 1, further comprising a sensor accommodated in said profile such that the sensor yields an output signal varying according to a sensitivity as a function of a magnitude of a pressure application.

18. The sensor accommodating profile as claimed in claim 17, wherein the sensor comprises a pressure sensing element having a resistance that decreases as an applied pressure increases.

19. The sensor accommodating profile as claimed in claim 1, wherein the different regions with different deformability are co-extruded of different materials.

20. The sensor accommodating profile as claimed in claim 1, wherein the different regions with different deformability have different degrees of Shore hardness and bulk densities.

21. The sensor accommodating profile as claimed in claim 1, wherein the profile is adapted to accommodate and protect a pressure activatable sensor.

22. The sensor accommodating profile as claimed in claim 1, wherein the profile is adapted to form a window guide profile.

* * * * *

UNITED STATES PATENT AND TRADEMARK OFFICE
CERTIFICATE OF CORRECTION

PATENT NO. : 5,847,289
DATED : December 8, 1998
INVENTOR(S) : Hans-Gunter Lehnen It is certified that error appears in the above-indentified patent and that said Letters Patent is hereby corrected as shown below:

On the Title Page:

Under item [63], insert:

--Continuation-in-part of PCT/DE95/00980, July 27, 1995.--

Delete Items [22], [86] and [87].

Page 1, after the title and before line 2, insert:

--This application is a continuation-in-part of PCT/DE95/00980 filed July 2, 1995.--

Signed and Sealed this

Tenth Day of April, 2001

*Attest:*

NICHOLAS P. GODICI

*Attesting Officer*     *Acting Director of the United States Patent and Trademark Office*